(12) United States Patent
Tamburino et al.

(10) Patent No.: US 6,781,763 B1
(45) Date of Patent: Aug. 24, 2004

(54) IMAGE ANALYSIS THROUGH POLARIZATION MODULATION AND COMBINATION

(75) Inventors: Louis A. Tamburino, Kettering, OH (US); John Taboada, San Antonio, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/120,215

(22) Filed: Apr. 1, 2002

(51) Int. Cl.$^7$ .......................... G02B 27/14; G02F 1/00
(52) U.S. Cl. ...................... 359/629; 359/618; 348/757
(58) Field of Search .......................... 359/629, 618, 359/634; 348/744, 751, 752, 757

(56) References Cited

U.S. PATENT DOCUMENTS

| | | | |
|---|---|---|---|
| 4,124,278 A | 11/1978 | Grinberg et al. | |
| 4,125,864 A | 11/1978 | Aughton | |
| 4,481,531 A | 11/1984 | Warde et al. | |
| 4,956,714 A | 9/1990 | Takanashi et al. | |
| 5,051,770 A | 9/1991 | Cornuejols | |
| 5,062,693 A | 11/1991 | Beratan et al. | |
| 5,107,460 A | 4/1992 | Matthews | |
| 5,115,305 A | * 5/1992 | Baur et al. | 348/751 |
| 5,153,759 A | 10/1992 | Haas et al. | |
| 5,157,451 A | 10/1992 | Taboada et al. | |
| 5,159,456 A | 10/1992 | Takanashi et al. | |
| 5,162,861 A | 11/1992 | Tamburino et al. | |
| 5,208,696 A | 5/1993 | Kobayashi et al. | |
| 5,237,233 A | 8/1993 | Conley | |
| 5,309,262 A | 5/1994 | Haas | |
| 5,377,026 A | 12/1994 | Liu et al. | |
| 5,381,253 A | 1/1995 | Sharp et al. | |
| 5,552,912 A | 9/1996 | Sharp et al. | |

(List continued on next page.)

OTHER PUBLICATIONS

Songcan Lai et al., "Wave front reconstruction by means of phase–shifting digital in–line holography", Journal Optics Communications, Jan. 1, 2000, published by Elsever Science B. V.

Songcan Lai et al, "Digital wavefront reconstruction and its application to image encryption", Journal Optics Communications, May 15, 2000, published by Elsevier Science B. V.

B. Skarman et al., "Digital in–line holography for the analysis for the analysis of Benard–convection", Journal Flow Measurement and Instrumentation, 10 (1999) 91–97, published by Elsever Science B. V.

(List continued on next page.)

*Primary Examiner*—Ricky Mack
(74) *Attorney, Agent, or Firm*—Gerald B. Hollins; Thomas L. Kundert (57) ABSTRACT

A substantially passive optical image processor providing image dissection into orthogonally polarized components each modulated on a pixel-by-pixel basis in one or more encounters with an included polarization-altering modulator element of electrical or optical nature. The modulation-processed images are recombined into an output image of the processor. Alternate arrangements of the invention are also described, arrangements including multiple modulation event processing in a plurality of forms and the accommodation of multiple input and multiple output processor images. Mathematical description of the processor's function is included along with identification of real world uses of the invention. Holographic uses of the invention are also disclosed. The underlying concepts of the invention are viewed as applicable to both present day slower and faster future optical materials.

34 Claims, 6 Drawing Sheets

U.S. PATENT DOCUMENTS 5,841,489 A    11/1998   Yoshida et al.
5,896,359 A    4/1999   Stoll
6,222,674 B1 *   4/2001   Ohta ............................ 359/618

OTHER PUBLICATIONS

Marcello Pelillo, "The Dynamics of Nonlinear Relaxation Labeling Processes", Journal of Mathematical Imaging and Vision, vol. 7, pp. 309–323 (1997), published by Kluwer Academic Publishers, Netherlands.

Qin Chen et al. "Relaxation Labeling Algorithm for Information Integration and its Convergence", journal Pattern Recognition, vol. 28, No. 11 1722, (1995) published by Elsever Science B. V.

Robert A. Hummel et al., "On the Foundations of Relaxation Labeling Process", IEEE Transactions on Pattern Analysis and Machine Intelligence, vol. PAMI–5, No. 3, May 1983.

* cited by examiner

IMAGE ANALYSIS THROUGH POLARIZATION MODULATION AND COMBINATION

RIGHTS OF THE GOVERNMENT

The invention described herein may be manufactured and used by or for the Government of the United States for all governmental purposes without the payment of any royalty.

BACKGROUND OF THE INVENTION

This invention concerns the field of electro-optical image processing, i.e., processing inclusive of pixel-by-pixel image resolving, modification and reconstruction.

In the field of optical image processing there is often need for a pixel-resolving image processor and image combiner of small physical size and functional simplicity. Pixel by pixel sized area processing and combining of images can of course be accomplished by electronic systems and computer aided electronic processing but such processing appears considerably less well known in the form of a primarily optical apparatus as disclosed in the present invention.

The present image analysis invention enables the optic combining and splitting of input images, modulating phases of split image components, and controlling the relative proportions of energy exiting an image analysis apparatus with virtually zero loss of total energy. The invention performs these functions with a compact, robust, adaptable and efficient electro-optical image splitting device and/or image combiner. The electro-optical image splitting device is particularly robust in terms of rugged construction and ability to withstand high intensity light.

The present invention is a useful component for more general optical processing systems. Since it is a device that can modify and analyze the polarization states of images, it has potential applications in image analysis, optical computers, imaging phase fluorimeters, communication, holography, and light modulation. The present invention also provides an optimal arrangement for use in the "Laser Imaging and Ranging System Using Two Cameras" and "Laser Imaging and Ranging System Using One Camera" systems of our previous U.S. Pat. Nos. 5,157,451 and 5,162,861 and may also be used to form in-line digital holograms as are described below.

There is therefore perceived to be needed in this field a simplified optics-based image processor, a processor providing an output image modified according to a predetermined image modulation from an input image or from two input images. The present invention is believed to provide such processing.

SUMMARY OF THE INVENTION

The present invention Image Modulator and Combiner, (IMAC), is an electro-optical switching device that can combine multiple incoming images into multiple outgoing images while modulating image signals as a function of the electrical potential or optical signals applied to slant mirror modulators (SMM) and perpendicular transmitting modulators (PTM). Variation of the signals applied to these modulators provides means for rapidly re-proportioning the relative energy in the output images. The energy in the output images is equal to the energy in input images except for some transmission losses (conservation of energy).

The present invention therefore provides a simple and substantially passive dissection and recombination arrangement for processing an input optical image into an output optical image or multiple output images of related but selectively modified characteristics.

It is an object of the present invention therefore to provide simplified pixel-based optical image processing.

It is another object of the invention to provide a pixel dissecting optical image modulation apparatus.

It is another object of the invention to achieve a multiple input image and multiple output image-capable passive optical image processor.

It is another object of the invention to provide a passive optical image processor in which optical prism elements may be used or omitted.

It is another object of the invention to provide a passive optical image processor for holographic imaging.

It is another object of the invention to provide an image dissecting and processing arrangement in which both multiple modulator elements and multiple different modulator element types can be utilized.

Additional objects and features of the invention will be understood from the following description and claims and the accompanying drawings.

These and other objects of the invention are achieved by optical Image Modulator and Combiner apparatus comprising the combination of:

a polarizing optical beam splitter input member having first image component and second image component orthogonally polarizing optical output ports and having first and second optical image input ports;

first and second pixel modulated optical image modulator elements disposed in angled orientation with respect to polarized image components appearing at said first image component and second image component orthogonally polarizing beam splitter member output ports and generating pixel modulated output signal versions of optical beam splitter output signals emerging from said first image component and said second image component orthogonally polarizing optical output ports in response to input signals received at said first and second optical image input ports;

a polarized beam combiner output member having first and second image component input ports in communication with respective of said first and second pixel modulated optical image modulator elements and said pixel modulated output signal versions of optical beam splitter output signals emerging therefrom and generating a recombined image component pair of output signals.

DETAILED DESCRIPTION

In our previously issued U.S. Pat. Nos. 5,157,451 and 5,162,861 titled "Laser Imaging and Ranging System Using Two Cameras" and "Laser Imaging and Ranging System Using One Camera" respectively there are disclosed laser based systems for object range detection, range detection based on time of signal propagation between a source and the target to be range-detected. In each of these systems, there is employed an "electro-optical polarization modulating element" 128 which is disclosed to be of Kerr cell or Pockels cell nature and which imparts a voltage-controllable degree of angular rotation to the polarization of processed optical signals. One envisioned use of the present Image Modulator and Combiner invention is in the physical realization of the "electro-optical polarization modulating element" 128 in these prior patent ranging systems. Other uses including the generation of holographic images are also envisioned for the present invention and are discussed below. The content of the "Laser Imaging and Ranging System Using Two Cameras" and "Laser Imaging and Ranging System Using One Camera", U.S. Pat. Nos. 5,157,451 and 5,162,861, is hereby each incorporated by reference herein.

The present invention polarization modulation and combination image analysis system or Image Modulator and Combiner is therefore an electro-optical switching device capable of combining multiple incoming images into processed multiple outgoing images. The polarization modulation and combination Image analysis system also performs modulating of image signals in response to an electrical potential applied to incorporated component parts such as slant mirror modulators (SMM) and perpendicular transmitting modulators (PTM). A pixel-by-pixel change in the potentials applied to these modulators provides for rapidly re-proportioning energy in the output images among the image pixels. By way of conservation of energy principles the energy in the output images of the Image Modulator and Combiner is equal to that in the input images except for transmission losses.

Most arrangements of the Image Modulator and Combiner invention described herein contain several polarizing beam-splitter cubes (PBSC) and 45-degree prisms (i.e., prisms of 45, 90 and 45 degree angles between faces) such arrangements of the invention appear in FIG. 1 through FIG. 5 of the drawings. The FIG. 1 drawing therefore shows a three dimensional perspective view of a prism-included fundamental Image Modulator and Combiner apparatus. In the FIG. 1 drawing the Image Modulator and Combiner 100 is shown to include the polarized beam splitter cubes 102 and 104, the 45 degree prisms 106 and 108 and the slant mirror modulator element 110 located on the orthogonal angle-opposite face of the prism 108. A similar slant mirror modulator is located in the corresponding position of prism 106 in the FIG. 1 apparatus but not shown from the perspective of the FIG. 1 drawing. The FIG. 1 embodiment of the Image Modulator and Combiner apparatus may be fabricated in a large range of physical sizes, the representative dimension at 114 for example may be one to two centimeters or can easily range up to four centimeters or more; in reality, almost any size of commercial components may be used.

Figure 1:
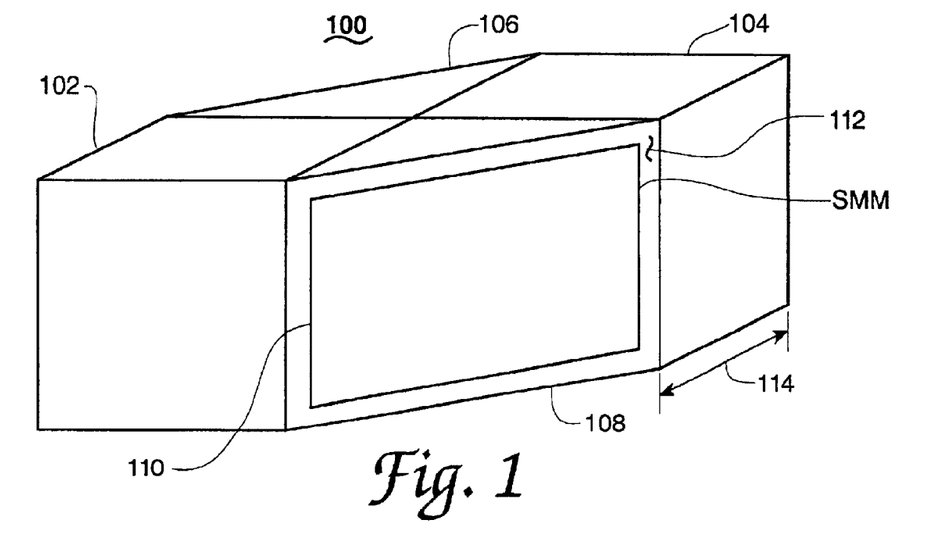
FIG. 1 shows a three-dimensional perspective view of a fundamental Image Modulator and Combiner apparatus according to the present invention.
Figure 2:
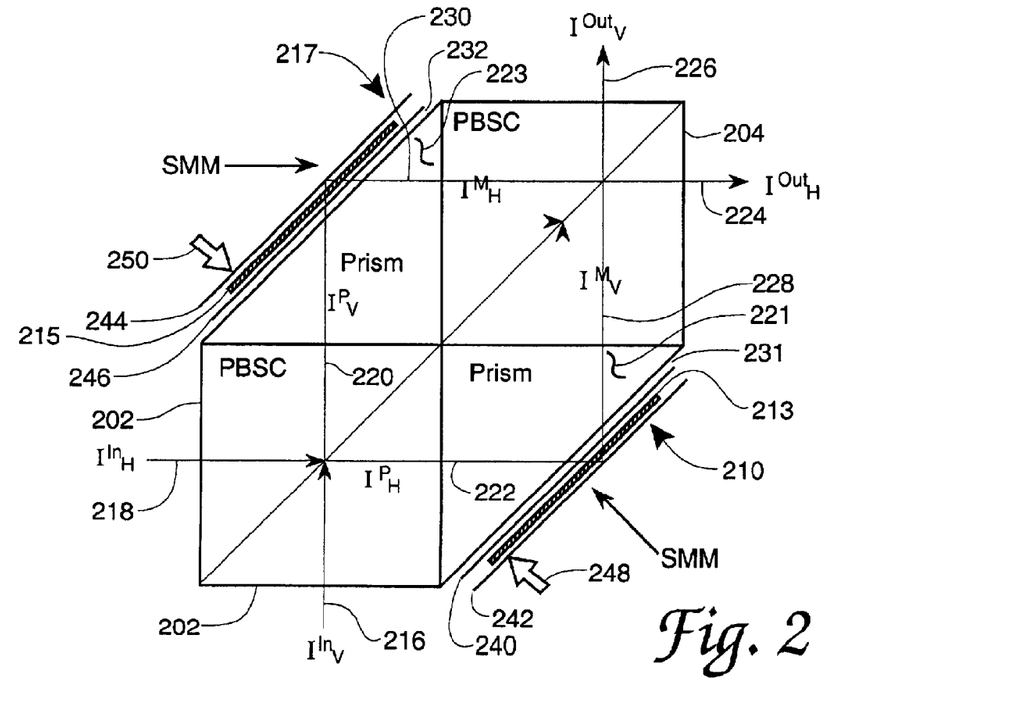
FIG. 2 shows a planar diagrammatic representation of a FIG. 1 type of Image Modulator and Combiner apparatus.

The basic Image Modulator and Combiner arrangement, as shown in the FIG. 1 perspective view and the related FIG. 2 top view drawings, illustrates the concept wherein prism elements are joined to cube elements at the prism orthogonal faces (i.e., by the faces on opposed side of the prism 90 degree angle). This leaves the remaining orthogonal angle-opposite prism faces (e.g., face 112) free for mounting the modulators used in conjunction with Polarizing Beam-Splitter Cubes 102, 104 here represented as reflective modulators 110, 210, 217. (As accomplished here, similar elements of the invention are identified in the different drawings herein with numbers of the same digit and tens value but a hundreds digit value corresponding with the drawing FIG. number.) The reflective modulators 210 and 217 are shown with exaggerated spaces 231 and 232 between modulator 210 and prism 221 and between modulator 217 and prism 223 in the interest of drawing clarification.

Figure 3:
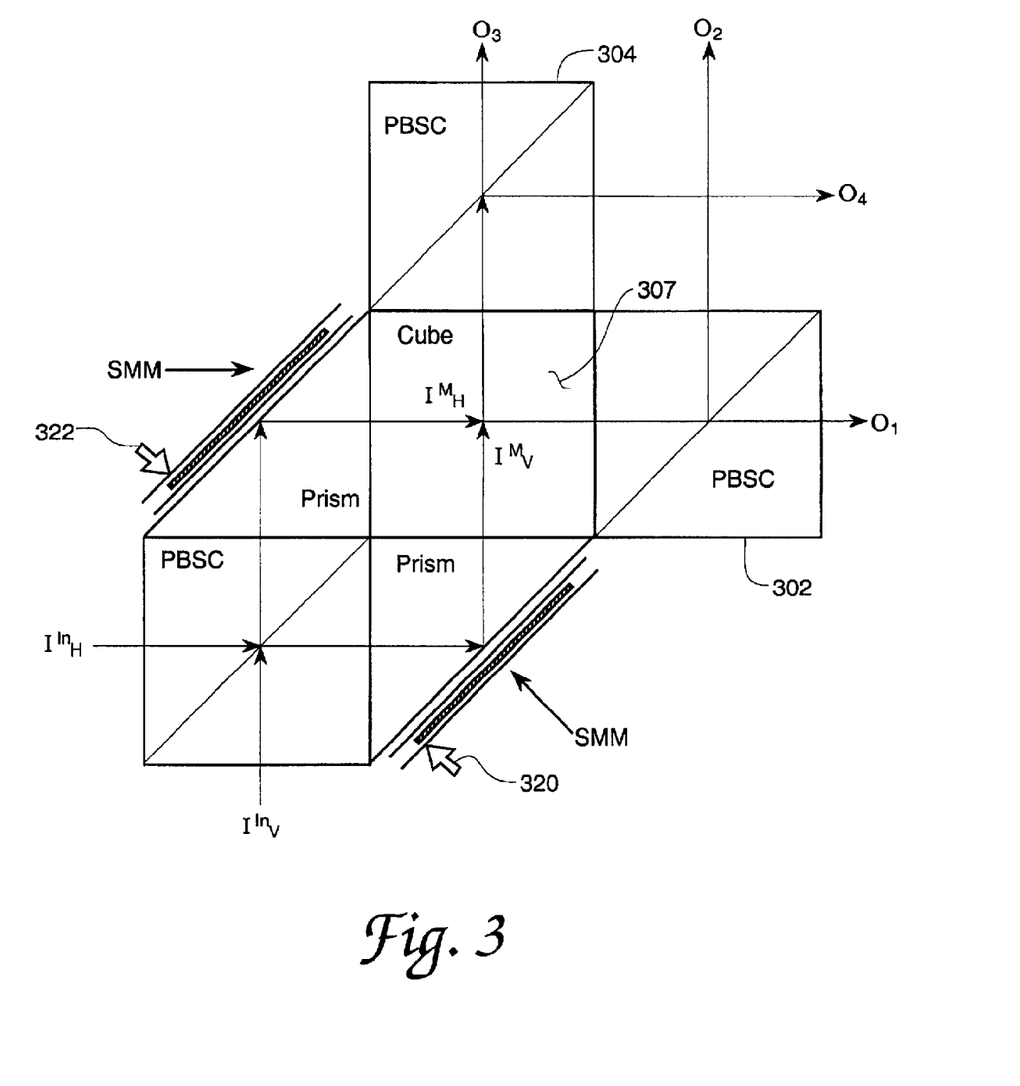
FIG. 3 shows a four-output, three beam-splitter, version of the FIG. 2 Image Modulator and Combiner apparatus in diagrammatic representation.
Figure 4:
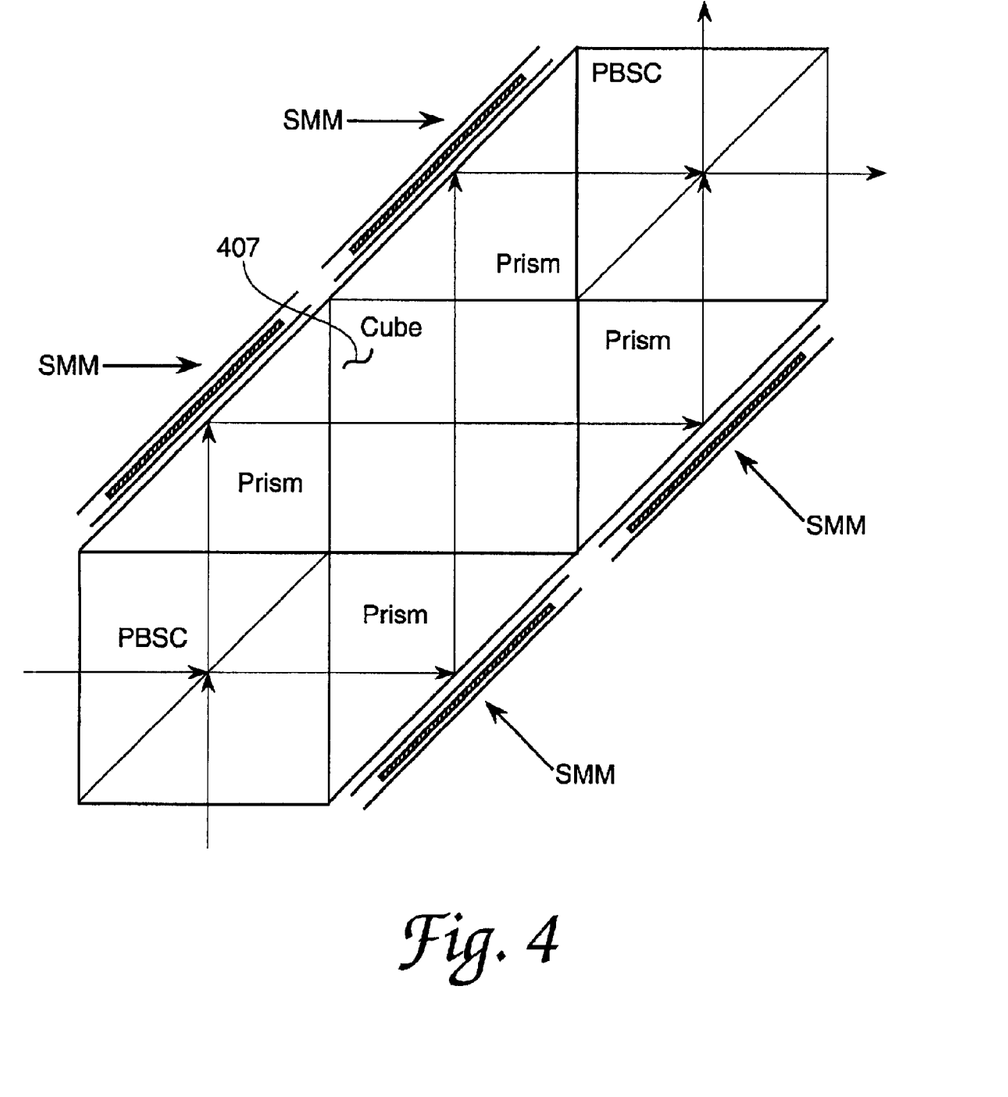
FIG. 4 shows a diagrammatic representation of a multiple reflection version of the FIG. 2 Image Modulator and Combiner apparatus.
Figure 5:
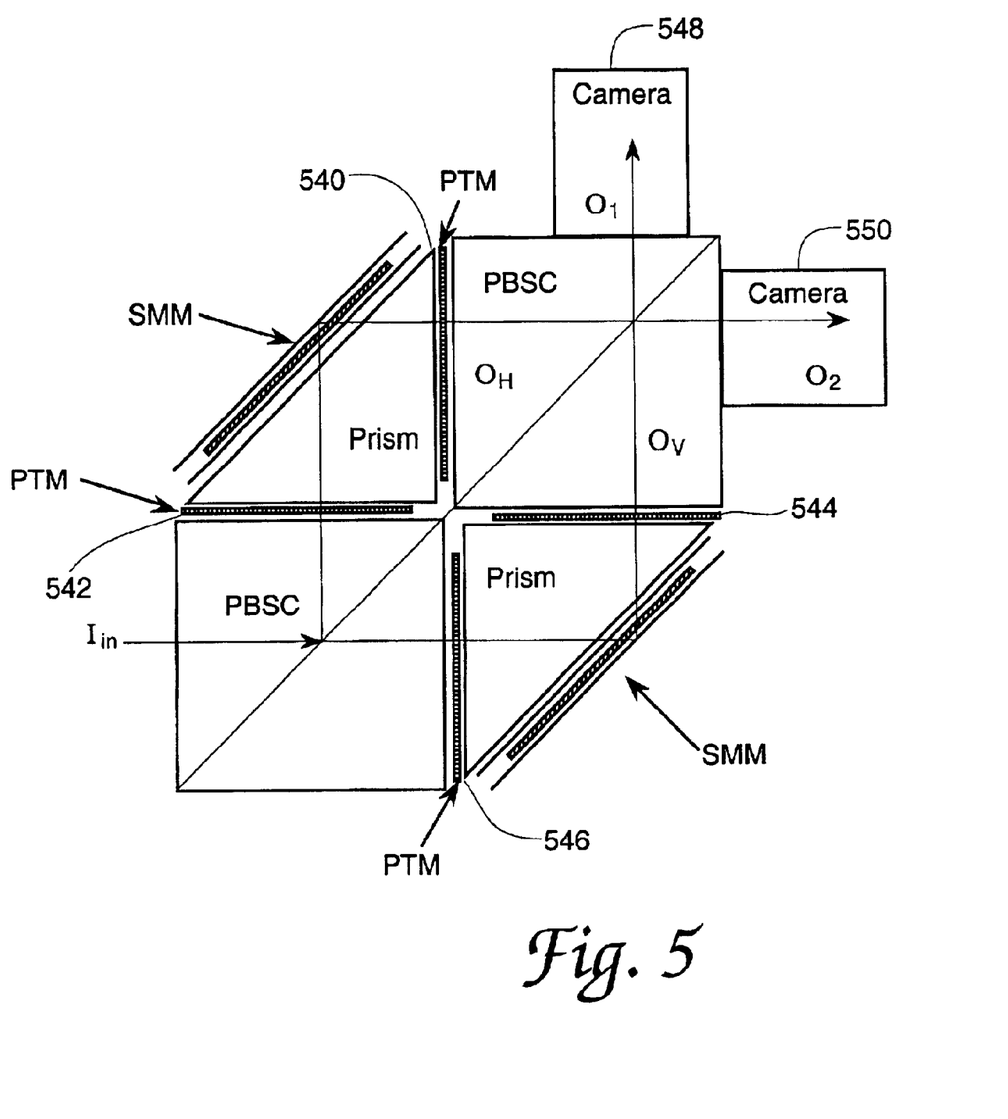
FIG. 5 shows a multiple modulator arrangement of the FIG. 2 Image Modulator and Combiner apparatus with two-camera output.
Figure 6:
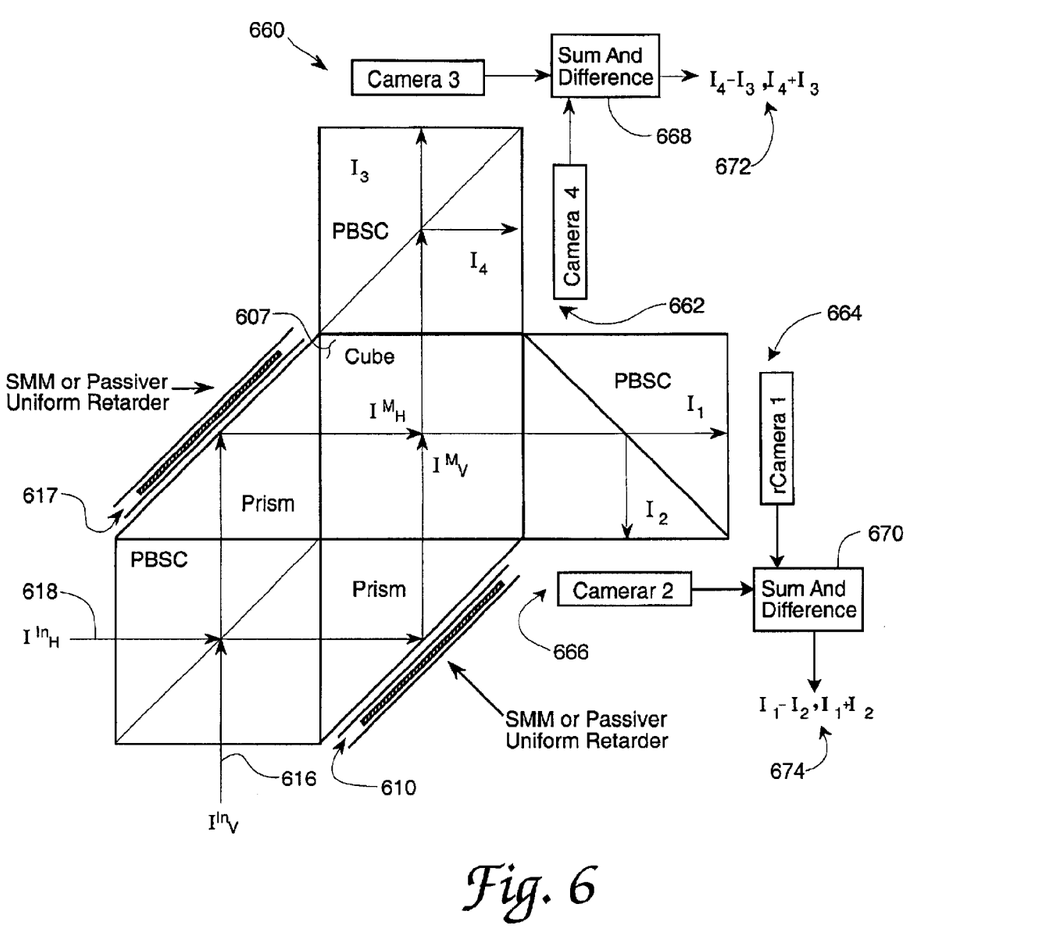
FIG. 6 shows a four-camera (recorder) arrangement according to FIG. 3 and the present invention for recording holographic images.

Generally the illustrated Image Modulator and Combiner embodiments are characterized by the use of pairs of parallel Slant Mirror Modulators. As in FIG. 1 and FIG. 2 these modulators are mounted on opposite prisms. A fundamental Image Modulator and Combiner with two parallel Slant Mirror Modulators is described first herein. Some versions of the Image Modulator and Combiner may, as shown in FIG. 3, FIG. 4 and FIG. 6 of the drawings, use glass cubes 307 and 407 and 607 in the locations occupied by polarized beam splitter cube elements in order to maintain a solid and uniform Image Modulator and Combiner structure while relegating polarization processing of the component images to another element of the apparatus. Generally the action of a glass cube on the optical component signals is to passively transmit optical component signals with no birefringence. Perpendicular transmitting modulators (PTM), which may be attached to the orthogonal prism faces, can also be used to augment or replace the basic Slant Mirror Modulators 110, 210, 217 as is shown in the FIG. 5 embodiment of the invention. Modulation theory for use of a Slant Mirror Modulator or a Perpendicular Transmitting Modulator is the same.

In general, images can enter an Image Modulator and Combiner along either or both of the two orthogonal paths indicated at 216 and 218 in the FIG. 2 drawing. A Polarizing Beam-Splitter Cube input element, for example elements 102, 202, splits each input image into two component images, a reflective and a transmissive component or a vertical and a horizontal component as are shown at 220 and 222 in FIG. 2. After emerging from the first Polarizing Beam-Splitter Cube 102, 202, each of these components is reflected and modulated at a Slant Mirror Modulator 210 and 217 on the corresponding orthogonal angle-opposite prism face. Images enter and exit the reflecting modulators at approximately 45-degree angles. In this description, we consider only phase modulation. In addition much of the theoretical material in this description is based on the tacit assumption of a small field of view in which wave fronts are approximately planer. For example for parallel switching applications the input beamlets are all parallel so the modulator can determine the relative output paths of each beamlet.

A slant mirror modulator as shown at 110 in FIG. 1, and 210, 217 in FIG. 2 may be comprised of electrically or optically addressable, controllable reflectivity or controllable transmissivity pixel elements. Commercial liquid crystal devices of the reflective type are representative of the slant mirror modulators (SMM) used in the present invention while commercial liquid crystal devices of the transmitting type are representative of the perpendicular transmitting modulators (PTM) used in the present invention. Referring to FIG. 2, elements 240 and 246 are transparent conducting layers made of material such as ITO, Indium Tin Oxide. Elements 213 and 215 are Pockels cell material such as KD*P. deuterated potassium phosphate. Elements 242 and 244 are conducting reflectors such as silver or aluminum.

A simple and preferred embodiment for the slant mirror modulators of the present invention consists of a layer of Pockels-like material sandwiched between a reflecting electrode and a transparent electrode such as Indium Tin Oxide. Present day examples of such Pockels material such as KD*P, deuterated Potassium Phosphate, use high voltage in high-speed optical image processing equipment as is employed in our above identified "Laser Imaging and Ranging System Using Two Cameras" and "Laser Imaging and Ranging System Using One Camera" devices. With reflection the light received at the slant mirror travels twice through the Pockels like material of the sandwich and thereby incurs double the polarization phase angle per volt of applied electric field intensity and reduces by a factor of two the voltage required by the Pockels modulator. Application of a voltage potential across each of the Pockels sandwiches alters the polarization phase of the reflected images and thus modifies the reflective and transmissive modes relative to the output polarizing beam splitter cube 104 and 204 in FIG. 1 and FIG. 2. The slant mirror modulators of the present invention may also be embodied as lower voltage devices using a layer of liquid crystal material sandwiched between a reflecting electrode and a transparent electrode such as Indium Tin Oxide.

In the FIG. 1 and FIG. 2 embodiment the modulation need not always be pixel addressable. According to a more sophisticated arrangement of the FIG. 1 and FIG. 2 embodiments of the present invention however a slant mirror modulator or reflective modulator is made pixel addressable, in which case pixels in the images may be independently modulated and recombined. With such pixel addressing the reflective layers 213 and 215 of the slant mirror modulator is divided into pixel-sized areas, which are controlled by individual electrical or optical signals. The application of slant mirror modulator signals of either the individual pixel or all pixel types is represented at 248 and 250 in the FIG. 2 drawing. Such signals may be of either the electrical or optical variety. For most uses of the invention the signals 248 and 250 are synchronized. The type of modulator used depends on the particular application. A single element-addressable modulator can be used for the "Laser Imaging and Ranging System Using Two Cameras" or the "Laser Imaging and Ranging System Using One Camera". Such a modulator can also be used as a simple beam-switching device, and to record in-line holograms. Pixel addressable modulators are needed to reconstruct the inline hologram and to accomplish complex beam array switching.

The Image Modulator and Combiners of FIG. 1 and FIG. 2 each produce two phase-modulated images as output from the two slant mirror modulators. These images enter a second polarized beam splitter cube, as represented at 104 and 204 in the FIG. 1 and FIG. 2 drawings, this entry being along orthogonal paths 228 and 230. In the polarized beam splitter cubes 104 and 204 corresponding image components from each modulated Image add together to form two orthogonal output images, images communicated along the paths 224 and 226 in the FIG. 2 drawing. Note that a randomly polarized signal is input at 216 and 218 and theoretically all the input energy is contained in the polarized components at 224 and 226. The relative magnitude of these two output images at each pixel point is a function of the modulating signals applied to the signals 220 and 222 at the slant mirror modulators 210 and 217 or other applied modulating signals (one may use an optically addressable space light modulator for the modulators 110, 210, 217). Additional polarized beam splitter cubes can be used to separate the two output images into three or four-plane-polarized output images as is represented in the FIG. 3 drawing. The four distinct output images in FIG. 3 are achieved with the two extra-polarized beam splitter cubes indicated at 302 and 304 and also with the aid of the passive glass cube 307. Different versions of the Image Modulator and Combiner invention may be classified by the number of output images generated. For example the apparatus of FIG. 2 and FIG. 4 are classified as Image Modulator and Combiner-2 and Image Modulator and Combiner-4 systems respectively.

In a fundamental two-output Image Modulator and Combiner (as in FIG. 1 and FIG. 2) with zero modulation signal, the distribution of energy in the output Image is the same as in the input image or images; however, the output images move in a direction that is orthogonal to the corresponding input direction. For zero modulation signal, the phases $\gamma$ and $\delta$ in equations 7 through 10 are equal to zero, so that the recombined vectors given by equations 11 and 12 are similar to equations 1 and 2 except for direction of the two orthogonal beams (V<->H). Also with application of quarter wave modulation signal, so that $\gamma=\delta=\pi/2$, the transmissive component become reflective and vice versa (T<->R). Therefore, the quarter wave signal produces output images at the second polarized beam splitter cube whose energy and directions match the input images. At intermediate signal, the relative energy within the various components is a function of the applied modulating signal.

With respect to the Image Modulator and Combiner switching capability and the preceding paragraph it may be stated that with zero or quarter wave modulation the intensity of the output beams are same as input beams except their directions change by ninety degrees in the later case. Also with intermediate signals the input signal energies are apportioned to the two output beams according to the magnitude of the modulating signals.

The FIG. 2 drawing also traces the energy distribution within a fundamental Image Modulator and Combiner for two input light images, one horizontal and one vertical, and two output images. Each image is equivalent to an array of beamlets, which maintain their relative registration as they pass through the various phases of separation, modulation, and recombination. In order to simplify the description of the Image Modulator and Combiner, we focus on a single beam from the image array as representative of the possible modulations and combinations that may be applied in parallel to all the beamlets in the image array. Without loss of generality, it is assumed that the slant mirror modulator has pixel-addressable modulation signals so that each beamlet can be independently modulated. This also covers all classes of modulators including those electrical signal modulators having a single large electrode affecting the entire image.

The function of an Image Modulator and Combiner device can be modeled with straightforward mathematical derivations. To simplify the equations used to describe how light is modified in the device in the following discussion, we assume conservation of energy and neglect terms describing energy losses in the Image Modulator and Combiner device. In the interest of language simplicity in this and succeeding material we also consider the modulators to employ electrical input signals. Also in this discussion, we represent the amplitude of the light beams by complex numbers and select a set of basis vectors designating two components reacting differently when passed through a Polarizing Beam-Splitter Cube. One part specifies the amplitude of the transmissive component and the other the reflective component. The intensity of the light beam (beamlet) is the product of the amplitude and its complex conjugate. The two input beams may be represented by $$E^{In}_H = E_{HT} \cdot e_T + E_{HR} \cdot e_R \qquad (1)$$

$$E^{In}_V = E_{VT} \cdot e_T + E_{VR} \cdot e_R \qquad (2)$$

where the two unit vectors, $e_T$ and $e_R$, refer to the field components transmitted or reflected relative to the Polarizing Beam-Splitter Cubes in the Image Modulator and Combiner. The horizontal and vertical polarized output beams from the first polarized beam splitter cube are then represented by:

$$(E_H)^P = E_{HT} \cdot e_T + E_{VR} \cdot e_R \qquad (3)$$

$$(E_V)^P = E_{VT} \cdot e_T + E_{HR} \cdot e_R. \qquad (4)$$

These two beams are modulated by the separate slant mirror modulators which can induce different retardation parameters ($2\gamma$, $2\delta$) depending on the voltage applied to each modulator. Various modulation representations are possible, however we adopt the following modulation model for this description:

$$(E_H)^M = (E_1)^{Out} e_T + (E_2)^{Out} e_R \qquad (5)$$

$$(E_V)^M = (E_3)^{Out} e_T + (E_4)^{Out} e_R \qquad (6)$$

where $$(E_1)^{Out} = \tfrac{1}{2}(E_{VT} + E_{HR}) + \tfrac{1}{2}(E_{VT} - E_{HR})e^{i2\gamma} = (E_{VT}\cos\gamma - iE_{HR}\sin\gamma)e^{i\gamma} \qquad (7)$$

$$(E_2)^{Out} = \tfrac{1}{2}(E_{VT} + E_{HR}) - \tfrac{1}{2}(E_{VT} - E_{HR})e^{i2\gamma} = (E_{HR}\cos\gamma - iE_{VT}\sin\gamma)e^{i\gamma} \qquad (8)$$

$$(E_3)^{Out} = \tfrac{1}{2}(E_{VR} + E_{HT}) - \tfrac{1}{2}(E_{VR} - E_{HT})e^{i2\delta} = (E_{HT}\cos\delta - iE_{VR}\sin\delta)e^{i\delta} \qquad (9)$$

$$(E_4)^{Out} = \tfrac{1}{2}(E_{VR} + E_{HT}) + \tfrac{1}{2}(E_{VR} - E_{HT})e^{i2\delta} = (E_{VR}\cos\delta - iE_{HT}\sin\delta)e^{i\delta} \qquad (10)$$

are the amplitudes of the four outputs beams illustrated in FIG. 3, outputs of a four-output Image Modulator and Combiner. Letting the two modulated beams meet and recombine in a second Polarizing Beam-Splitter Cube, we obtain the two beams illustrated in FIG. 2:

$$(E_H)^{Out} = (E_1)^{Out} e_T + (E_4)^{Out} e_R \qquad (11)$$

$$(E_V)^{Out} = (E_3)^{Out} e_T + (E_2)^{Out} e_R \qquad (12)$$

The four output intensities corresponding to Equations 7–10 are given by $$(I_1)^{Out} = E_{VT}\bar{E}_{VT}(\cos\gamma)^2 + E_{HR}\bar{E}_{HR}(\sin\gamma)^2 - i(\bar{E}_{VT}E_{HR} - E_{VT}\bar{E}_{HR})(\sin\gamma\cdot\cos\gamma) \qquad (7a)$$

$$(I_2)^{Out} = E_{VT}\bar{E}_{VT}(\sin\gamma)^2 + E_{HR}\bar{E}_{HR}(\cos\gamma)^2 + i(\bar{E}_{VT}E_{HR} - E_{VT}\bar{E}_{HR})(\sin\gamma\cdot\cos\gamma) \qquad (8a)$$

$$(I_3)^{Out} = E_{HT}\bar{E}_{HT}(\cos\delta)^2 + E_{VR}\bar{E}_{VR}(\sin\delta)^2 + i(\bar{E}_{HT}E_{VR} - E_{HT}\bar{E}_{VR})(\sin\delta\cdot\cos\delta) \qquad (9a)$$

$$(I_4)^{Out} = E_{HT}\bar{E}_{HT}(\sin\delta)^2 + E_{VR}\bar{E}_{VR}(\cos\delta)^2 + i(\bar{E}_{HT}E_{VR} - E_{HT}\bar{E}_{VR})(\sin\delta\cdot\cos\delta) \qquad (10a)$$

or rewriting them as:

$$(I_1)^{Out} = (|E_{VT}|\cos\gamma)^2 + (|E_{HR}|\sin\gamma)^2 + 2(|E_{VT}||E_{HR}|\sin\gamma\cdot\cos\gamma)\sin(\Phi_{HR}-\Phi_{VT}) \qquad (13)$$

$$(I_2)^{Out} = (|E_{VT}|\sin\gamma)^2 + (|E_{HR}|\cos\gamma)^2 - 2(|E_{VT}||E_{HR}|\sin\gamma\cdot\cos\gamma)\sin(\Phi_{HR}-\Phi_{VT}) \qquad (14)$$

$$(I_3)^{Out} = (|E_{HT}|\cos\delta)^2 + (|E_{VR}|\sin\delta)^2 - 2(|E_{HT}||E_{VR}|\sin\delta\cdot\cos\delta)\sin(\Phi_{HT}-\Phi_{VR}) \qquad (15)$$

$$(I_4)^{Out} = (|E_{HT}|\sin\delta)^2 + (|E_{VR}|\cos\delta)^2 + 2(|E_{HT}||E_{VR}|\sin\delta\cdot\cos\delta)\sin(\Phi_{HT}-\Phi_{VR}) \qquad (16)$$

where $E_x = |E_x| \cdot E^{i\Phi_x}$ and $\bar{E}$ = the complex conjugate of E and $(Ix)^{Out} = Ex \cdot \bar{E}x$. Both sets of equations easily demonstrate that total output energy equals the total input energy although the later set explicitly demonstrates the dependency on the relative phases of the components of the two output beams from the first polarized beam splitter cube.

The Laser Imaging And Ranging devices described in our above identified two patents uses only one input beam and applies the same voltages to both modulators so that $\gamma=\delta$, $I_V=0$, and the intensities of the two outputs are $$(I_H)^{Out} = \langle (E_H)^{Out}(\bar{E}_H)^{Out}\rangle = \langle (I_1)^{Out} + (I_4)^{Out}\rangle = \langle I_H^{In}(\sin\gamma)^2\rangle \qquad (17)$$

$$(I_V)^{Out} = \langle (E_V)^{Out}(\bar{E}_V)^{Out}\rangle = \langle (I_2)^{Out} + (I_3)^{Out}\rangle = \langle I_H^{In}(\cos\gamma)^2\rangle \qquad (18)$$

$$\text{where } I_H^{In} = I_T^{In} + I_R^{In} = |E_{HT}|^2 + |E_{HR}|^2 \qquad (18a)$$

By combining the two components of the Polarizing Beam-Splitter Cube in the output, the two recorded output signals utilize all the energy in the input beam $I_H^{In}$. Previous Laser Imaging And Ranging modulators used only a linear polarized portion of the input beam. Equations 17 and 18 also illustrate how the Image Modulator and Combiner can switch a beam into two output channels while controlling the energy proportions.

ALTERNATE ARRANGEMENTS

Additional perpendicular transmitting modulators disposed on the short faces or orthogonal faces of each prism can be used to augment or replace the slant mirror modulators 110, 210, 217 etc. Arrangements of this type are shown in the FIG. 5 drawing where the perpendicular transmitting modulator elements 540, 542 and 544, 546 are also labeled "PTM". With the illustrated arrangement of the perpendicular transmitting modulators, each component of the input image signal passes through three modulating elements. An advantage of additional modulating elements is that the modulation voltage needed to achieve $\pi/2$ angular phase shift is reduced proportional to the number of times the light passes through the Pockels material. The Image Modulator and Combiner-2X illustrated in FIG. 5 has two additional transmitting modulators associated with each prism. To modify the above equations when there are Perpendicular Transmitting Modulators mounted on the Image Modulator and Combiner prisms, a multiplicative exponential term of the form $e^{i\Delta}$ is used to represent each Perpendicular Transmitting Modulator. The FIG. 5 Image Modulator and Combiner is provided with cameras 548 and 550 to record the processed output images.

In addition to phase modulation of images by an Image Modulator and Combiner it is also possible to include amplitude modulation, which does not conserve energy in general. Amplitude modulation introduces real multiplicative terms that define the gain imposed on the signals in an Image Modulator and Combiner. A typical example of such hybrid combinations of Image Modulator and Combiner may use Slant Mirror Modulator on the diagonal faces and Perpendicular Transmitting Modulators on non-diagonal faces of the prisms. Particular Image Modulator and Combiner modulation schemes can of course be customized to specific use needs.

Perhaps the most versatile modulating element is represented by a pixel addressable liquid crystal light valve (LCLV). Each pixel of such a Liquid Crystal Light Valve can modulate a beamlet in accordance with the above equations. Mounted on the diagonal prism face (in substitution for the of the Slant Mirror Modulator in FIGS. 1–6), a Liquid Crystal Light Valve is capable of modulating a large number of beamlets in parallel.

In-line Digital Holography with Image Modulator and Combiner

If the two input beams, $I^{In}_H$ and $I^{In}_V$, to a FIG. 3 Image Modulator and Combiner are viewed as image and reference waves the four output images described in equations 13–16 may be seen as a multiplicity of holograms. A modification of the FIG. 3 apparatus capable of this function is shown in FIG. 6 of the drawings. In the FIG. 6 apparatus the four output images may be recorded on film or by cameras as shown at 660, 662, 664 and 666.

If CCD cameras are used in the FIG. 6 apparatus, then the four images can be transformed into four images that also record the intensities and relative phases of the two polarized components in the input Image wave. The reduction for digitally recorded images is accomplished by taking the following sum and differences between image pairs as illustrated by the computations at 668 and 670 in FIG. 6 and the computed quantities at 672 and 674 in FIG. 6

$$(I_1)^{Out} + (I_2)^{Out} = K^2 + E_{HR}^2 \quad [19]$$

$$(I_4)^{Out} + (I_3)^{Out} = K^2 + E_{HT}^2 \quad [20]$$

$$(I_1)^{Out} - (I_2)^{Out} = 2K \cdot E_{HR} \cdot \sin(\phi_{HR} - \phi_{VT}) \quad [21]$$

$$(I_4)^{Out} - (I_3)^{Out} = 2K \cdot E_{HT} \cdot \sin(\phi_{HT} - \phi_{VR}) \quad [22]$$

where $$K = |E_{VT}| = |E_{VR}|, \quad [23]$$

$$\gamma = \delta = \pi/4, \quad [24]$$

and the reference wave is assumed here to have equal uniform components ($|E_{VT}|=|E_{VR}|$) so that K is a constant. Also, the modulation is uniform and equal on both sides of the Image Modulator and Combiner, i.e. $\gamma=\delta=\pi/4$ for all pixels. Because the reference wave $E_V$ is uniform, one can determine the constant magnitude constant K with a small number of sampling pixels. Equations 19 and 20 yield the values of magnitude of $|E_{HT}|$ and $|E_{HR}|$, which can be used in Equations 21 and 22 to solve for ($\phi_{HR}-\phi_{VT}$) and ($\phi_{HT}-\phi_{VR}$). Thus, a digital description of the amplitude and relative phase ($\phi_{HR}-\phi_{HT}$) for each of the two polarized components of the image wave is derived. Such digital polarization holograms suggest use of Image Modulator and Combiner components in the analysis of light polarization.

Recent literature demonstrates it is possible to use a single charge coupled device electronic camera in lieu of conventional photographic media to record a hologram and to use numerical means to generate phase and amplitude images or to reconstruct a holographic real image. A large amount of processing is required however to extract the phase and amplitude data and to reconstruct the holographic real image by these current methods; moreover the amount of such processing scales upward in a non linear manner with the size, i.e., the number of pixels, in the charge coupled device image being processed. With use of the present invention Image Modulator and Combiner hologram algorithm however processing that is orders of magnitude less than with these current methods is sufficient, and even more significantly, such processing scales upward only linearly with the number of pixels processed.

The FIG. 6 apparatus may therefore be used to generate a digitized polarized holographic decomposition of the input image received at 616 and 618. Four sum and difference image pairs as indicated at 672 and 674 are computed from the four recorded output images as described in equations 19–24. These four sum and difference image pairs can be directly reduced to a pair of amplitude and relative phase images for each polarized component of the input image $I^{In}_H$ 618. In this application of the FIG. 6 apparatus elaborate electro-optical slant mirror modulators are not needed at 610 and 617; only a uniform passive $\pi/4$ retarder as described in equation 24 is required in each location. Such a passive retarder moreover may be embodied as a slab of optical material such as quartz or calcite.

Figure 7:
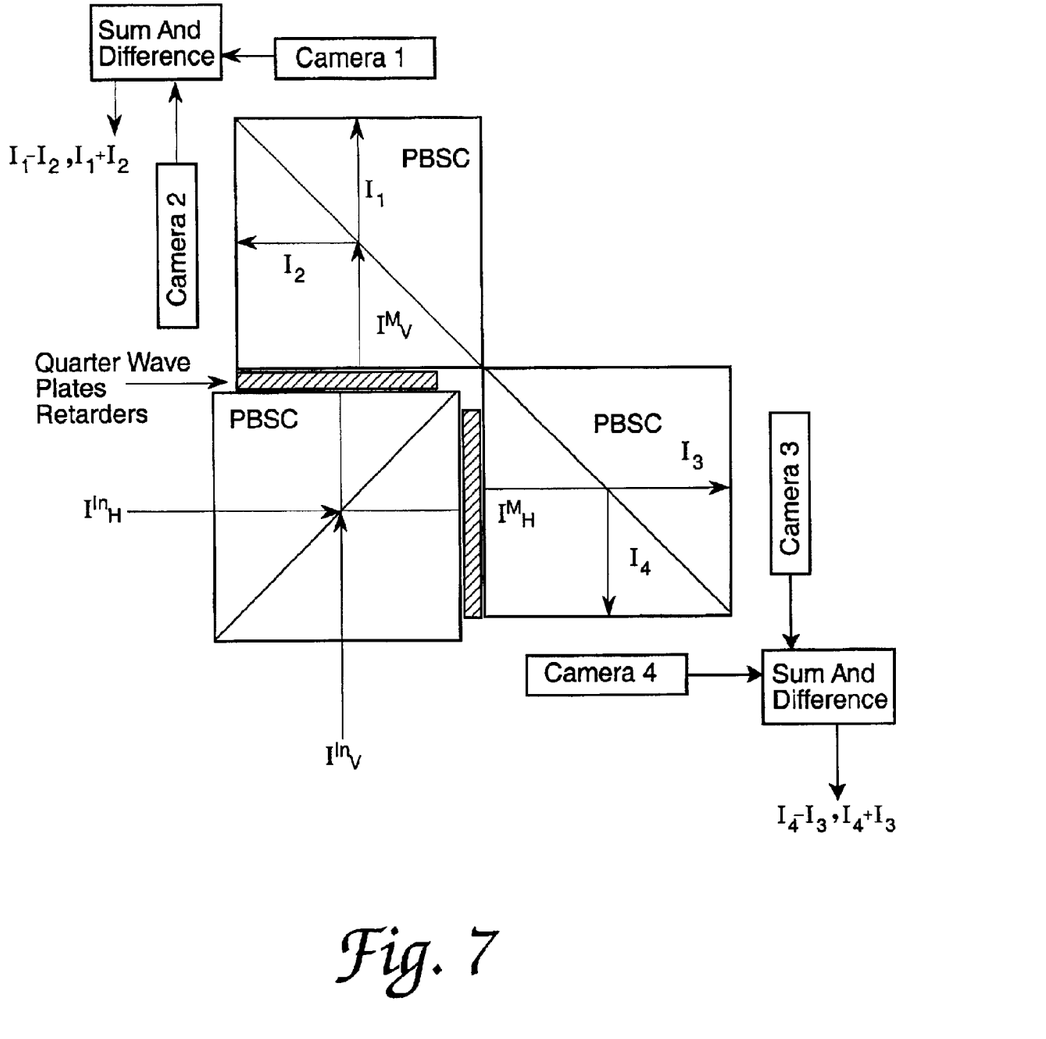
FIG. 7 shows a simplified configuration for generating and recording holographic images with four cameras.

FIG. 7 in the drawings shows a simplified arrangement for generating and recording holographic images using four cameras as in FIG. 6. The FIG. 7 apparatus is functionally similar to the arrangements shown in FIG. 3 and FIG. 6 for the special case holographic application. The FIG. 7 apparatus employs three polarized beam splitters and the indicated passive uniform retarders located along the output path of the input polarized beam splitter but requires no prisms. In the illustrated simplified form without variable modulators the FIG. 7 apparatus is of course not capable of modulation as needed in the "Laser Imaging and Ranging System Using Two Cameras" and "laser Imaging and Ranging System Using One Camera" systems described in our two previously issued patents.

It should be noted that the immediately adjacent or tight robust disposing of optical components shown in the FIG. 1–FIG. 7 drawings herein although advantageous for many uses of the invention is not mandatory especially in hologram applications of the invention. These illustrated optical components may in fact be decoupled or spread-out on an optical bench without departing from the scope of the invention.

Imaging Phase Fluorimeter Applications

The Image Modulator and Combiner of the present invention may be used in an imaging phase fluorimeter. An imaging phase fluorimeter is an instrument using a fast photo excitation source such as a repetitive pulsed laser to excite fluorescence together with a fast photodetector measuring the fluorescence decay through consideration of signal phase relationships. Because the Image Modulator and Combiner can be rapidly switched, slow detectors can be used to measure picosecond domain signals of two dimensional sample distributions such as in a microscope field. In essence the decay curves can be determined for an image type sample distribution. This type of data can be useful in chemical analysis of complex samples, for example in gene coding work. The information can also be useful in chemical and biological weapon defense developments.

The present invention Image Modulator and Combiner is believed to provide plural novel features; features including:

A. The ability to rapidly and electronically or optically re-proportion the energy in one or more input images of un-polarized light into multiple output polarized images.

B. The ability to rapidly re-proportion and/or combine images into two separate images or up to four plane polarized images without significant loss of energy.

C. The ability to control the mixed proportions of output images by an applied voltage potential.

D. The ability to combine images separated by another Image Modulator and Combiner in order to recover the original image signal.

E. A compact configuration of optical structure used to separate, modulate, and combine reflected and transmissive image components. This configuration may be extended to facilitate the use of multiple sets of slant mirror modulators. The image components can experience multiple reflections between sets of parallel modulators. FIG. 4 herein shows an example of an extended two-bounce Image Modulator and Combiner using four Slant Mirror Modulators.

F. Adverse interference between the multiple images is absent in the Image Modulator and Combiner invention.

G. The component elements of the invention are conventional Polarizing Beam-Splitter Cubes and prisms. In the Image Modulator and Combiner these components are arranged in an optimal configuration that is compact, rugged, and efficient. This configuration facilitates construction of a solid substrate by the Joining of a minimal number of face-to-face attachments of prisms and cubes. Alternate versions of the Image Modulator and Combiner maintain this compact, robust pattern of joining additional prisms into solid assembly.

H. The described configuration provides convenient, solid surfaces for mounting the slant mirror modulators on external faces of the prisms. This, together with the conventional shape of the optical components, facilitates efficient assembly of Image Modulator and Combiner devices that would be hard to duplicate with alternative configurations.

I. The included image modulators may be pixel addressable.

J. Sub-units of the invention facilitate the implementation of compact Image Modulator and Combiner arrays accepting multiple input images and redistributing the energy among multiple output images as a function of variable voltages applied at an array of electrodes.

K. The image Modulator and Combiner allows electrical control, analysis, and mixing among the polarization states of multiple images.

L. Peripatetically transmitting (non-reflective) modulators (PTM) may be placed on the non-diagonal faces of the Image Modulator and Combiner prisms in addition to or in replacement of the Slant Mirror Modulators mounted on diagonal faces of the prisms.

M. Image Modulator and Combiner apparatus may also be configured to include amplitude modulation.

N. The disclosed Image Modulator and Combiner are robust in terms of physical construction and ability to withstand high intensity light energy.

O. The invention provides for combining and splitting input images, modulating phases of split image components, and controlling the relative proportions of energy exiting an Image Modulator and Combiner with virtually zero loss of total energy.

P. The invention is a useful component for more general optical processing systems.

Q. The Image Modulator and Combiner lends to potential applications in image analysis, optical computers, communication, holography, and light modulation.

R. The invention is an optimal arrangement for a Laser Imaging And Ranging electro-optical modulator component.

S. The invention has utility as a device to modify and analyze the polarization states of images.

T. The invention can be used as an image-switching device.

The Image Modulator and Combiner of the present invention therefore provides an electro-optical switching device capable of combining multiple incoming images into multiple outgoing images while modulating image signals as a function of signals including electrical potential applied to incorporated slant mirror modulators and perpendicular transmitting modulators. Variation of the potentials applied to these modulators provides means for rapidly re-proportioning the relative energy in the output images. The energy in the output images is however equal to the energy in input images except for transmission losses.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Optical Image Modulator and Combiner apparatus comprising the combination of:

a polarizing optical beam splitter input member having first image component and second image component orthogonally polarizing optical output ports and having first and second optical image input ports;

first and second pixel modulated optical image modulator elements disposed in angled orientation with respect to polarized image components appearing at said first image component and second image component orthogonally polarizing beam splitter member output ports and generating pixel modulated output signal versions of optical beam splitter output signals emerging from said first image component and said second image component orthogonally polarizing optical output ports in response to input signals received at said first and second optical image input ports;

a polarized beam combiner output member having first and second image component input ports in communication with respective of said first and second pixel modulated optical image modulator elements and said pixel modulated output signal versions of optical beam splitter output signals emerging therefrom and generating a recombined image component pair of output signals.

2. The optical Image Modulator and Combiner apparatus of claim 1 further including an optical prism element received intermediate each said polarizing beam splitter input member and said polarized beam combiner output member and wherein said first and second pixel modulated optical image modulator elements are disposed adjacent an exposed face of each said optical prism element.

3. The optical Image Modulator and Combiner apparatus of claim 2 wherein said optical prism element includes an apex angle of forty five degrees between two adjacent prism faces, and an apex angle of ninety degrees between two adjacent prism faces and wherein each said first and second pixel modulated optical image modulator element is disposed adjacent a prism face opposite said ninety degree apex angle.

4. The optical Image Modulator and Combiner apparatus of claim 2 wherein said apparatus includes a plurality of said optical prism elements each disposed intermediate said polarizing beam splitter input member and said polarized beam combiner output member and wherein a pixel modulated optical image reflector element is disposed adjacent an exposed face of each said prism.

5. The optical Image Modulator and Combiner apparatus of claim 4 wherein said apparatus further includes an optical cube member disposed intermediate said polarizing beam splitter input member and said polarized beam combiner output member.

6. The optical Image Modulator and Combiner apparatus of claim 1 wherein said first and second pixel modulated optical image modulator elements comprise optical slant mirror modulator elements and wherein said slant mirror modulator elements are responsive to synchronized control signals of one of an electrical and an optical nature.

7. The optical Image Modulator and Combiner apparatus of claim 2 wherein said first and second pixel modulated optical image modulator elements include optical slant mirror modulator elements each comprised of:

an optically transparent first layer electrode element;

an optically reflective second layer electrode element;

one of said first layer electrode element and said second layer electrode element being subdivided into pixel sized electrically isolated electrode element areas;

said first and second layer electrode elements being separated by a voltage responsive optical signal polarization determining and one of an optically reflective and an optically transmissive material.

8. The optical Image Modulator and Combiner apparatus of claim 2 wherein said first and second pixel modulated optical image modulator elements include optical slant mirror modulator elements each comprised of passive uniform retarder material.

9. The optical Image Modulator and Combiner apparatus of claim 1 wherein said polarized beam combiner output member includes first and second optical image output ports one of horizontal and one of vertical orientation.

10. The optical Image Modulator and Combiner apparatus of claim 1 wherein said polarizing beam splitter input member, said polarized beam combiner output member, and said first and second pixel modulated optical image modulator elements are disposed in immediate adjacency with touching facial surfaces.

11. The optical Image Modulator and Combiner apparatus of claim 1 wherein said polarizing beam splitter input member, said polarized beam combiner output member, and said first and second pixel modulated optical image modulator elements are disposed in non-touching physical segregation across an optical bench surface.

12. The optical Image Modulator and Combiner apparatus of claim 1 further including an optical cube member, an optical prism member and a plurality of said polarized beam combiner output members.

13. The optical Image Modulator and Combiner apparatus of claim 1 wherein said pixel modulated optical image modulator elements include one of an electrical modulation signal input port and an optical modulation signal input port.

14. The optical Image Modulator and Combiner apparatus of claim 1 wherein said first and second pixel modulated optical image modulator elements include optical slant mirror modulator elements each comprised of passive uniform retarder material and wherein said apparatus also includes a hologram recorded image input port connected with each of said modulator elements.

15. The optical Image Modulator and Combiner apparatus of claim 1 further including:

a plurality of said polarized beam combiner output members each having a plurality of optical output signal ports;

a charge coupled device camera recorder apparatus optically connected with each of said optical output signal ports;

sum and difference signal computation apparatus connected with each of said charge coupled device camera recorder apparatus.

16. The optical Image Modulator and Combiner apparatus of claim 15 further including an optical cube element disposed in an optical input port of said polarized beam combiner output members.

17. The optical Image Modulator and Combiner apparatus of claim 16 wherein said optical image input port includes a plurality of signal input channels and further including a plurality of said polarized beam combiner output members each having a plurality of signal output channels.

18. The optical Image Modulator and Combiner apparatus of claim 1 wherein said polarizing optical beam splitter input member first and second optical image input ports are oriented in horizontal and vertical directions.

19. The method of image modulation and image combination processing of input optical image data comprising the steps of:

separating said input optical image data into orthogonally polarized first and second component optical image data;

modulating each said first and second component optical image data according to a selected pattern of pixel-by-pixel modulation data;

said steps of separating and modulating each maintaining beamlet energy distribution integrity between input and processed image data;

optically recombining modulated versions of said first and second component optical image data into an output optical image of beamlet energy distribution integrity between input and output image data.

20. The method of image modulation and image combination processing of claim 19 wherein said modulating step includes the steps of:

passing each said first and second component optical image data through a transparent electrode into a polarization modifying material and thence to a reflecting electrode and through a second portion of said polarization modifying material.

21. The method of image modulation and image combination processing of claim 20 wherein said step of modulating each said first and second component optical image data is accomplished in said polarization modifying material and said reflecting electrode.

22. The method of image modulation and image combination processing of claim 19 wherein said step of modulating each said first and second component optical image data includes processing each of said first and second component optical image data in a plurality of modulators.

23. The method of image modulation and image combination processing of claim 19 wherein said step of separating input optical image data includes separating a plurality of input optical images into said first and second component optical image data.

24. The method of image modulation and image combination processing of claim 19 wherein said step of optically recombining modulated versions of said first and second component optical image data into an output optical image includes image processing in a polarized beam splitter cube element.

25. The method of image modulation and image combination processing of claim 19 wherein said processing includes passing image data through a nonpolarized optical cube element.

26. The method of image modulation and image combination processing of claim 19 further including the step of communicating optical signals between physically segregated optical elements performing said steps of separating, modulating and optically recombining.

27. Apparatus for modulation and image combination processing of input optical images, said apparatus comprising the combination of:
  optical beam splitting means for segregating said input optical images into first and second orthogonally polarized image components;
  electrical modulation means for selectively reflecting or absorbing pixels of optical energy comprising said first and second orthogonally polarized image components said electrical modulation means also including means for altering a polarization phase characteristic of said first and second orthogonally polarized image components;
  optical signal combining means for combining said reflected portions and polarization phase-altered of said first orthogonally polarized image components and for combining reflected portions and polarization phase altered of said second orthogonally polarized image components into a recombination output image of said apparatus.

28. The modulation and image combination processing apparatus of claim 27 wherein each said optical beam splitting means and said optical signal combining means include multiple polarizing beam splitter cube elements.

29. The modulation and image combination processing apparatus of claim 28 further including optical prism means disposed in the path of each said first and second orthogonally polarized image components for communicating said image components toward and away from said electrical modulation means.

30. The modulation and image combination processing apparatus of claim 27 wherein said electrical modulation means includes a double pass optical path traversing both a transparent electrode element and a Pockels material element and also includes a reflective electrode element.

31. The modulation and image combination processing apparatus of claim 27 wherein said apparatus is characterized by energy included in said input optical images appearing in said recombination output image of said apparatus.

32. Holographic image generating and recording apparatus comprising the combination of:
  first polarized optical beam splitting means for segregating vertical and horizontal component input optical images into a first polarized image output signal and an orthogonally oriented second polarized image output signal;
  second polarized optical beam splitting means disposed adjacent a first output port face of said first polarized optical beam splitting means for receiving and generating from said first polarized optical beam splitting means first polarized image output signal a first output signals pair of orthogonally polarized camera input hologram signals;
  a first quarter wave plate image retarder disposed between said first polarized optical beam splitting means first output port face and an input port face of said second polarized optical beam splitting means and generating a first modulation-altered version of said first polarized optical beam splitting means first polarized image output signal at said input port face of said second polarized optical beam splitting means and first modulation-altered versions of said first output signals pair of orthogonally polarized camera input hologram signals at first and second output ports of said second polarized optical beam splitting means;
  third polarized optical beam splitting means disposed adjacent a second output port face of said first polarized optical beam splitting means for generating from said first polarized optical beam splitting means second polarized image output signal a second output signals pair of orthogonally polarized camera input hologram signals;
  a second quarter wave plate image retarder disposed between said first polarized optical beam splitting means second output port face and an input port face of said third polarized optical beam splitting means and generating a second modulation-altered version of said second polarized optical beam splitting means second polarized image output signal at said input port face of said third polarized optical beam splitting means and second modulation-altered versions of said second output signals pair of orthogonally polarized camera input hologram signals at first and second output ports of said third polarized optical beam splitting means.

33. The holographic image generating and recording apparatus of claim 32 further including:
  first and second camera means disposed at said first and second output ports of said second polarized optical beam splitting means for recording said first output signals pair of orthogonally polarized camera input hologram signals; and
  third and fourth camera means disposed at said first and second output ports of said third polarized optical beam splitting means for recording said second output signals pair of orthogonally polarized camera input hologram signals.

34. The holographic image generating and recording apparatus of claim 33 further including:
  first sum and difference signal generating means receiving input signals from output ports of said first camera means and said second camera means and generating therefrom a sum output optical signal and a difference output optical signal;
  second sum and difference signal generating means receiving input signals from output ports of said third camera means and said fourth camera means and generating therefrom a sum output optical signal and a difference output optical signal.

* * * * *